United States Patent
Kamata et al.

(10) Patent No.: US 6,954,277 B2
(45) Date of Patent: Oct. 11, 2005

(54) IMAGE FORMING APPARATUS AND IMAGE FORMING METHOD

(75) Inventors: Yoshihisa Kamata, Tokyo (JP); Masaru Ushio, Tokyo (JP); Jun Yokobori, Tokyo (JP); Minoru Asakawa, Tokyo (JP); Junji Sato, Tokyo (JP)

(73) Assignee: Konica Corporation, Tokyo (JP)

( * ) Notice: Subject to any disclaimer, the term of this patent is extended or adjusted under 35 U.S.C. 154(b) by 907 days.

(21) Appl. No.: 09/813,210

(22) Filed: Mar. 20, 2001

(65) Prior Publication Data

US 2001/0026373 A1 Oct. 4, 2001

(30) Foreign Application Priority Data

Mar. 24, 2000 (JP) ........................................ 2000/085265

(51) Int. Cl.[7] .............................................. G06F 15/00
(52) U.S. Cl. ...................... 358/1.12; 358/1.1; 358/1.13; 358/1.14; 358/1.15
(58) Field of Search .................................. 358/1.18, 1.1, 358/1.12–1.15, 296, 458, 401; 382/295

(56) References Cited

U.S. PATENT DOCUMENTS

| 5,105,283 | A | | 4/1992 | Forest et al. |
| 5,760,912 | A | | 6/1998 | Itoh |
| 5,982,999 | A | * | 11/1999 | Aoyagi et al. ............. 358/1.18 |

* cited by examiner

*Primary Examiner*—Twyler Lamb
(74) *Attorney, Agent, or Firm*—Frishauf, Holtz, Goodman & Chick, P.C.

(57) ABSTRACT

An image forming apparatus for forming an image on a recording sheet whose area is larger than that of a predetermined size-fixed recording sheet, comprises an image forming member for forming an image on the recording sheet; a sheet feeder to feed the recording sheet to the image forming member; a controller to control the image forming member so as to form an image on the recording sheet such that a first central point of the recording sheet defined in terms of a main scanning direction perpendicular to a feeding direction of the recording sheet by the sheet feeder is placed on a first center line of the image, wherein the first center line is perpendicular to the main scanning direction, and one side of the image is parallel to one side of the recording sheet.

12 Claims, 15 Drawing Sheets

A = MAIN SCANNING IMAGE AREA (DOCUMENT MAIN
    SCANNING SIZE X MAIN SCANNING MAGNIFICATION)
B = TRANSFER SHEET MAIN SCANNING SIZE
C = SUB-SCANNING IMAGE AREA (DOCUMENT SUB-SCANNING
    SIZE X SUB-SCANNING MAGNIFICATION)
D = TRANSFER SHEET SUB-SCANNING SIZE
a = (B-A) / 2
b = B-C

C = SUB-SCANNING IMAGE SIZE (DOCUMENT SUB-SCANNING SIZE X SUB-SCANNING MAGNIFICATION)
D = (TRANSFER SHEET SUB-SCANNING SIZE) / 2
A = MAIN SCANNING IMAGE SIZE (DOCUMENT MAIN SCANNING SIZE X MAIN SCANNING MAGNIFICATION)
B = TRANSFER SHEET MAIN SCANNING SIZE
a = D−C
b = (B−A) / 2

FIG. 8

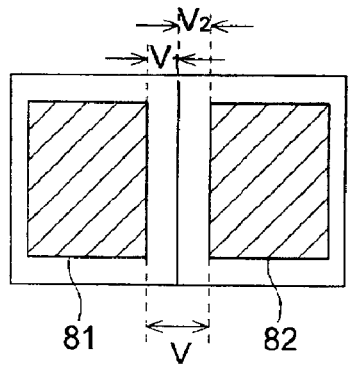

V: AMOUNT OF DISTANCE BETWEEN PAGES
V1: AMOUNT OF SHIFTING SUB-SCANNING OF PAGE 1
    IN SUB-SCANNING DIRECTION
V2: AMOUNT OF SHIFTING SUB-SCANNING OF PAGE 2
    IN SUB-SCANNING DIRECTION
$V_1 = -(V/2)$
$V_2 = V/2$
REFERENCE: SHIFT TO LEFT R NEGATIVE VALUE
           SHIFT TO RIGHT R POSITIVE VALUE

FIG. 9

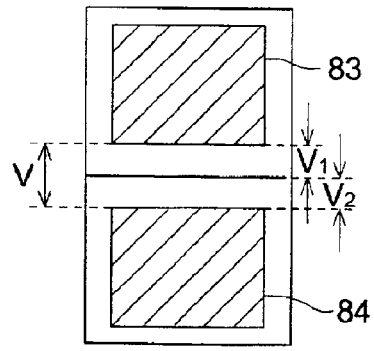

V: AMOUNT OF DISTANCE BETWEEN PAGES
V1: AMOUNT OF SHIFTING MAIN SCANNING OF PAGE 1
    IN SUB-SCANNING DIRECTION
V2: AMOUNT OF SHIFTING MAIN SCANNING OF PAGE 2
    IN SUB-SCANNING DIRECTION
$V_1 = -(V/2)$
$V_2 = V/2$
REFERENCE: SHIFT UPWARD R POSITIVE VALUE
           SHIFT TO RIGHT R NEGATIVE VALUE

SPECIFIC SHEET SETTING BUTTON

IMAGE FORMING APPARATUS AND IMAGE FORMING METHOD

BACKGROUND OF THE INVENTION

The present invention relates to an image forming apparatus and an image forming method.

As an image forming apparatus, there have so far been provided a copying machine wherein a document is placed on or supplied onto a platen glass (document glass), and images of character strings or graphics described on the document or combination thereof are copied on a transfer sheet, a printer wherein images similar to the foregoing which are formed on a word processor of a personal computer, for example, are printed on a transfer sheet, and a facsimile machine wherein images similar to the foregoing which are transmitted through communication lines are printed. There is further known the so-called "compound apparatus" which is constructed to be provided with all functions of these copying machine, printer and facsimile machine.

Incidentally, in the conventional image forming apparatus, there has been conducted, as shown in FIG. 14, image forming on a transfer sheet which is slightly greater in terms of area than a fixed-form size sheet that is generally called the so-called a wide sheet. Namely, image 800 has been to be formed with origin O representing one point on wide sheet P that serves as a reference point, in the same way as in the case to record images on a recording sheet in a fixed-form size.

With regard to image forming relating to the so-called booklet form, or image forming relating to a fixed-form 2-repeat form (both will be explained in detail in the embodiment of the invention described later), there has been conducted image forming shown in FIG. 15 or FIG. 16. In such a case, it is necessary to form two images on both sides of folding line $A_1$ in the sub-scanning direction of transfer sheet (wide sheet) P (see FIG. 15) or of folding line $A_2$ in the main scanning direction (see FIG. 16), but it is understood that image forming identical to that in FIG. 14 has been conducted.

Namely, in FIG. 15, wide sheet P is divided into two areas located on both sides of the folding line $A_1$ serving as a border line, then one point on each area is made to be an origin so that two areas respectively have origin $O_1$ and origin $O_2$, and positions of image forming for two images 801 and 802 have been determined respectively with the origin $O_1$ and origin $O_2$ each serving as a reference. Even in FIG. 16, it is understood that images 803 and 804 are formed with folding line $A_2$ in the main scanning direction serving as a border line and with origins $O_3$ and $O_4$ each serving as a reference, in the same way as in FIG. 15.

Incidentally, in the drawing, there are shown an occasion of "SEF (Short Edge Feed)" in which a length of wide sheet P in the main scanning direction is smaller than that in the sub-scanning direction (FIG. 15) and an occasion of "LEF (Long Edge Feed)" which is opposite to the foregoing (FIG. 16). In both of them, the direction of conveyance is in parallel with the sub-scanning direction.

A wide sheet is originally a recording sheet whose margin is supposed to be cut after images are recorded. Therefore, when an image is recorded on a wide sheet, it is necessary to record the image at the position which does not impede the degree of freedom, as far as possible. However, if an image is recorded so that an origin of the image is positioned at origin O of wide sheet P in the same way as in an occasion to record an image on a fixed-form size, as in the past, the degree of freedom tends to be impeded. In the past, therefore, when recording an image on a wide sheet, a user has been conducting shift setting for changing the recording position for the image. An example of the concrete method of shit setting is as follows. A user once outputs an image under the ordinary setting condition, and then measures an amount of shifting to the desired recording position by observing the image. After that, the user opens an applied image screen in FIG. 18 by pressing an "applied function" button on a basic screen of an operation panel on FIG. 17. Then, the user opens a screen for setting a binding margin in FIG. 19 by pressing "binding margin" button on the applied image screen, and inputs the direction of shifting and an amount of shifting. After that, the user has outputted an image again. Therefore, when recording an image on a wide sheet, a user has been compelled to do complicated operations, and its complicatedness had to be reckoned with, especially for a user who handles a large quantity of wide sheets.

Further, when recording an image of a booklet type and an image of a fixed-form and 2-repeat type as shown in FIGS. 15 and 16, even when attempting to change a distance between two images, two images have been regarded as one image to be processed, and therefore, the shift setting mentioned above has been impossible to adjust a distance between images freely. In other words, when forming a booklet by folding double a recording sheet on which an image has been recorded, it has been impossible to change freely the setting of a distance between pages.

Namely, in the past, when making a booklet by recording an image on a wide sheet, a user has been compelled to do complicated shift setting for changing an image recording position, and it has been impossible for the user to adjust freely a distance between pages, which was a problem.

SUMMARY OF THE INVENTION

The invention has been achieved in view of the circumstances stated above, and its object is to provide an image forming apparatus and an image forming method wherein it is possible to conduct image forming on a good working condition when forming images on a recording material whose area is greater than that of a recording material having a certain fixed-form size.

The invention has the following structures to solve the problem mentioned above.

Namely, an image forming apparatus in Structure (1) is represented by an image forming apparatus that forms images on a recording material whose area is greater than that of a recording material having a certain prescribed fixed-form size, wherein there is provided a control means which makes it possible to form the images on the recording material so that a central point defined with respect to the main scanning direction of the recording material may be on one central line defined with respect to the images, and one side of the images may be in parallel with one side of the recording material.

An image forming apparatus in Structure (2) is represented by the image forming apparatus according to Structure (1), wherein it is possible for the control means to form the images on the recording material so that the other one side of the images may be aligned with the other one side of the recording material.

An image forming apparatus in Structure (3) is represented by the image forming apparatus according to Structure (1), wherein it is possible for the control means to form the images on the recording material so that a central point defined with respect to the sub-scanning direction of the recording material may be on a central line that is perpendicular to the central line defined with respect to the images.

An image forming apparatus in Structure (4) is represented by the apparatus according to Structure (3), wherein the images are constructed to be one image by two images.

An image forming apparatus in Structure (5) is represented by the apparatus according to either one of Structure (1)–(4), wherein it is possible for the control means to form the images on the recording material so that a position for forming the images on the obverse side of the recording material may agree with that for forming the images on the reverse side.

An image forming apparatus in Structure (6) is represented by an image forming apparatus that forms images on a recording material whose area is greater than a certain fixed-form size, wherein there is provided a control means which makes it possible to form the images on the recording material so that a central point of the recording material may agree with a central point of the images.

An image forming apparatus in Structure (7) is represented by an image forming apparatus that forms images on a recording material whose area is greater than a certain fixed-form size, wherein there is provided a control means which makes it possible to form the images on the recording material by adjusting first so that a central point of the recording material may agree with a central point of the images, and by separating secondly the images on both sides of a standard line that is in the main scanning direction or in the sub-scanning direction of the recording material.

An image forming apparatus in Structure (8) is represented by an image forming apparatus that forms images on a recording material whose area is greater than a certain fixed-form size, wherein there is provided a control means which makes it possible to form the images on the recording material, by adjusting first so that a central point of the recording material may agree with a central point of the images, then separating secondly the images on both sides of a standard line that is in the main scanning direction or in the sub-scanning direction of the recording material, and by shifting thirdly the whole images separated on the recording material.

An image forming apparatus in Structure (9) is represented by the apparatus according to either one of Structure (6)–Structure (8), wherein the images are constructed to be one image by two images.

Further, an image forming method in Structure (10) is represented by an image forming method to form images on a recording material whose area is greater than a certain prescribed fixed-form size, wherein the images are formed on the recording material so that a central point defined with respect to the main scanning direction of the recording material may be on one central line defined with respect to the images, and one side of the images may be in parallel with one side of the recording material.

An image forming method in Structure (11) is represented by the image forming method according to Structure (10), wherein the images are formed on the recording material so that the other one side of the images may be aligned with the other one side of the recording material.

Further, an image forming method in Structure (12) is represented by an image forming method to form images constructed to be one image by two images on a recording material whose area is greater than a certain prescribed fixed-form size, wherein the step to form the images on the recording material is conducted after the step to adjust so that a central point of the recording material may agree with one central line of the images, the step to separate the images into two images on both sides of a standard line that is in the main scanning direction or in the sub-scanning direction of the recording material, the step to shift the whole separated two images on the recording material, and at least one or more steps among the aforesaid three steps.

BRIEF DESCRIPTION OF THE DRAWINGS

FIG. 8 is an illustration showing how a page distance extending function is conducted with respect to the image shown in FIG. 4.

FIG. 9 is an illustration showing how a page distance extending function is conducted with respect to the image shown in FIG. 5.

DETAILED DESCRIPTION OF THE PREFERRED EMBODIMENT

Figure 1:
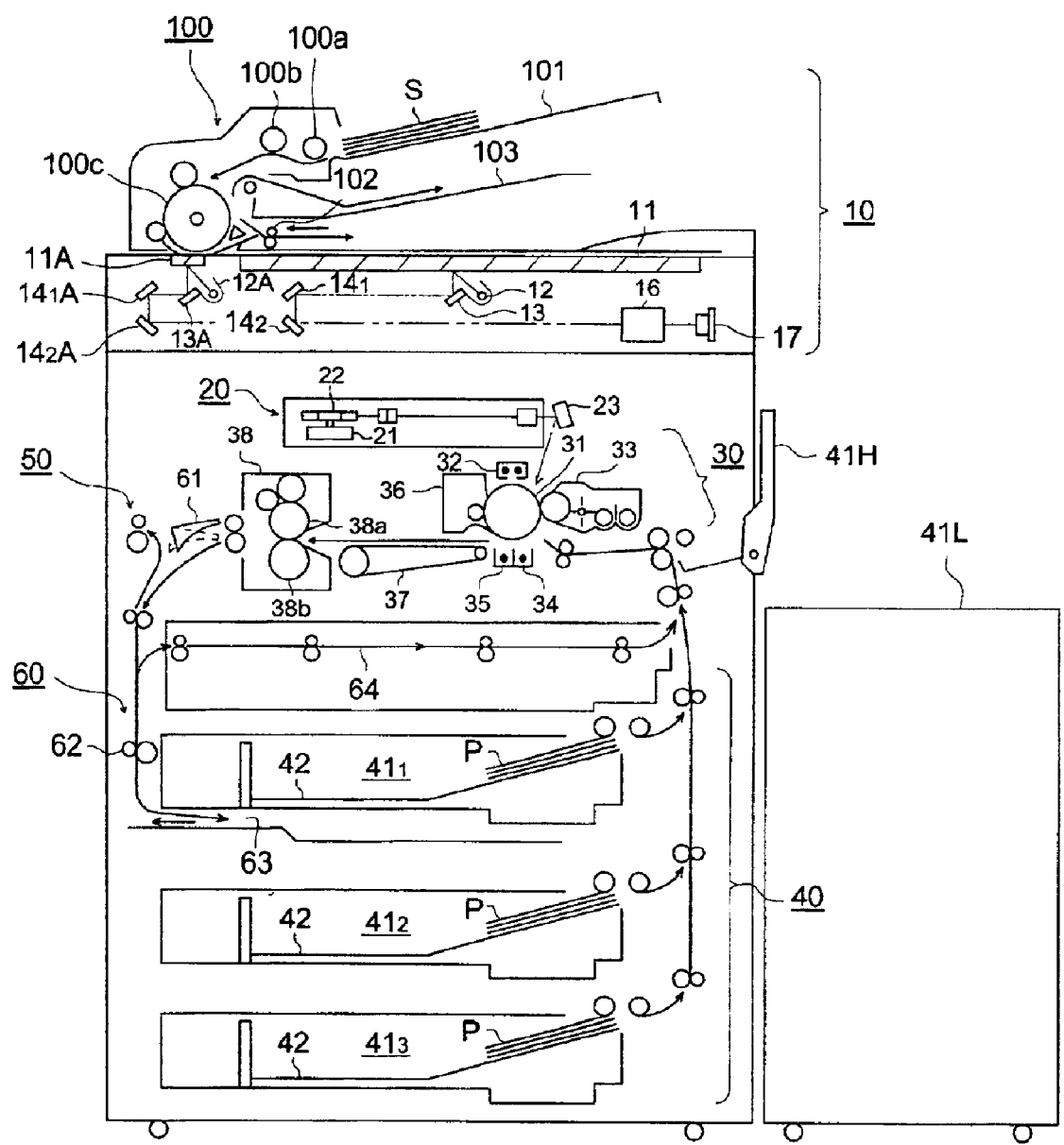
FIG. 1 is a schematic view showing an example of structure of a copying apparatus concerning the present embodiment.

An embodiment of the invention will be explained as follows, referring to drawings. FIG. 1 is a schematic view FIG. 1 is a schematic view showing an example of structure of a copying apparatus (an image forming apparatus) concerning the present embodiment. In FIG. 1, the copying apparatus is roughly composed of image reading section 10, image writing section 20, image forming section 30, transfer sheet conveyance section 40, transfer sheet rejection section 50 and transfer sheet reversing section 60, and it is further provided with external sheet feed means 41L which is mounted on the outer side of the apparatus main body. Incidentally, "a transfer sheet" mentioned in the present embodiment corresponds to (a recording material) mentioned in the invention.

Image reading section 10 is a part that reads, as optical information, character strings or graphics which are described on document S and are illuminated by illuminating light, and converts them into electrical information.

Document S is directly placed on platen glass 11 so that the surface (where images are formed) of the document may face the surface of the platen glass (document glass) 11. Light source 12 projects light on the surface of the document placed. Light arriving at the document surface turns into light (information) including its image information to be reflected on the surface, and arrives at mirror 13. Incidentally, the light source 12 and mirror 13 are arranged to be capable of moving along the surface of platen glass 11 so that the entire surface of the document may be scanned.

Further, the copying apparatus in the present embodiment is provided with automatic two-sided document conveyance section (RADF) 100 representing an automatic document feeding means. As shown in FIG. 1, the automatic two-sided document conveyance section 100 is arranged so that a document is separated from a bundle of plural sheets of documents S stacked on document placing stand 101 by feeding rollers 100a and 100b to be fed out, and is supplied onto slit glass 11A through roller 100c. In this case, light source 12 and mirror 13A are fixed respectively at positions 12A and 13A below the slit glass 11A. Due to this arrangement, images for plural sheets of documents S can be read continuously.

In addition to the foregoing, it is also possible to read both obverse and reverse sides of document S in the structure of the automatic two-sided document conveyance section 100 and slit glass 11A. In this case, one side of the document illuminated by light source fixed at a position 12A is read, then, after the reading is completed, document S is fed out once toward the right side in the drawing by reversing roller 102, then, the reversing roller 102 is reversed so that the document S may be taken up by roller c while the document S is conveyed toward the left side in the drawing, thus, the other side of the document S is made to face the surface of slit glass 11A. Incidentally, the document S that is supplied from the automatic two-sided document conveyance section 100 and is illuminated by light source fixed at a position 12A to be read Is stacked successively on sheet ejection tray 103.

Optical information related to the document surface read by light source 12 (12A) as stated above is reflected repeatedly on the following mirrors $14_1$ ($14_1$A), $14_2$ ($14_2$A) and arrives at CCD image pick-up device 17 through image forming optical system 16. The CCD image pick-up device 17 has therein a photoelectric surface (not shown) on which a plurality of pixels each having a function of photoelectric conversion are arranged, and optical information including image information on the document surface is received by the plural pixels, and are converted into electrical information.

Image writing section 20 is a section which radiates (writes) a laser beam controlled based on electrical information obtained in the aforesaid way on photoreceptor drum 31 described later, and thereby forms an electrostatic latent image on the photoreceptor drum 31.

The electrical information including image information obtained through conversion of optical information concerning the document surface is used for conducting the control related to a laser beam emitted from an unillustrated semiconductor laser. The laser beam controlled based on the aforesaid electrical information and emitted is radiated on polygon mirror 22 whose central portion is connected to drive motor 21 to be capable of rotating, and the laser beam reflected on the polygon mirror is projected on photoreceptor drum 31 through reflection mirror. When the polygon mirror 22 rotates while it is reflecting the laser beam, irradiation of the laser beam is conducted on photoreceptor drum 31 while the scanning in the direction of an axis of the photoreceptor drum is being conducted. Due to the irradiation of the laser beam, an electrostatic latent image based on the electrical information is formed on the photoreceptor drum 31.

Image forming section 30 is a section where an image is formed on transfer sheet P based on the electrostatic latent image formed on the photoreceptor drum 31.

An entire surface of the photoreceptor drum 31 is charged uniformly by charging section 32 as a preliminary work so that an electrostatic latent image caused by radiation of the laser beam is formed on the photoreceptor drum 31 as stated above. Developing section 33 makes charged toner particles to be stuck to the electrostatic latent image and visualizes the electrostatic latent image. In transfer section 34, the toner particles are transferred onto and stuck to transfer sheet P fed separately, and a toner image is formed on the surface of the transfer sheet P.

After this, with regard to the photoreceptor drum 31, separation section 35 separates the transfer sheet P attracted to the photoreceptor drum 31, and cleaning section 36 removes toner remaining on the photoreceptor drum 31 after the transfer operation to create a cleaned surface, so that uniform charging by charging section 32 and forming of an electrostatic latent image caused by radiation of a laser beam may be conducted again. On the other hand, with regard to the transfer sheet P, it is conveyed to fixing section 38 through conveyance mechanism 37. In the fixing section 38, heat and pressure are applied to transfer sheet P by heat rollers 38a and 38b to fix the toner image transferred, thus, an image is formed. After this, the transfer sheet P is ejected to the outside of the copying apparatus through several rollers provided in transfer sheet ejection section 50. At this point of time, "copying" of the image on the surface of the document on the surface of the transfer sheet P is completed.

Incidentally, in the copying apparatus of the present embodiment, transfer of a toner image from the photoreceptor drum 31 onto transfer sheet P can be conducted not only for one side of the transfer sheet P but also for the other side of the transfer sheet P. In this case, transfer sheet P for which one-side copying has been finished is conveyed to transfer sheet reversing section 60. Guide section 61 conducts switching of a convey path for transfer sheet P between the transfer sheet reversing section 60 and the transfer sheet ejection section 50. When the guide section 61 is switched so that transfer sheet P is conveyed downward in the drawing, the transfer sheet P is conveyed to reversing section 63 through reversing roller 62. Next, in the state wherein transfer sheet P is fed out toward reversing section 63 by a prescribed amount, the reversing roller 62 is reversed to convey the transfer sheet P to reversing conveyance path 64.

After this, the transfer sheet P passes through the reversing conveyance path 64 and arrives at the upstream side of the photoreceptor drum 31 again. In this case, the surface of the transfer sheet P facing the surface of the photoreceptor drum 31 is different from the surface subjected to transferring before the transfer sheet passes through transfer sheet reversing section 60. Incidentally, in general, when forming images actually on the transfer sheet P reversed in this way, new image information has been written on the photoreceptor drum 31 by the image writing section 20.

Transfer sheet conveyance section 40 is a section which conveys transfer sheet P to the aforesaid image forming section 30, especially to its photoreceptor drum 31.

Transfer sheet P is stacked and placed on tray 42 provided on each of a plurality of sheet feed cassettes (sheet feed means) 41 (three sheet feed cassettes 41₁, 41₂ and 41₃) constructed stepwise. These sheet feed cassettes 41 are constructed to be capable of being inserted in the apparatus main body when transfer sheet P is fed out to the image forming section 30, namely when an image is formed, and to be capable of being drawn out of the apparatus main body, when transfer sheet P is replenished. With regard to each of sheet feed cassettes 41₁, 41₂ and 41₃, it is possible to load transfer sheet P in each different size, such as loading "A4" in the first sheet feed cassette 41₁ and "A3" in the second sheet feed cassette 41₂ in correspondence of each size, for example, or to load thick sheet in A4 size in the first sheet feed cassette 41₁ and thin sheet in the same size in the second sheet feed cassette 41₂ in correspondence of each type of the sheet.

In such a state, if a size of transfer sheet P or a type of transfer sheet P is designated in the course of execution of copying, transfer sheet P is fed out of the sheet feed cassette corresponding to the designated size or type, to be conveyed toward the image forming section 30 by the structure of a plurality of conveyance rollers shown in FIG. 1.

In the present embodiment, there are provided, as a means to feed transfer sheet P, bypass feed tray 41H and outer sheet feed means 41L capable of storing a large amount of transfer sheets P in advance (so-called LCT) as shown in FIG. 1, in addition to sheet feed cassette 41 having the structure stated above. The former makes it possible to take actions when conducting image forming on a specific transfer sheet or OHP in particular, while, the latter makes it possible to conduct continuous image forming for a large amount of transfer sheets P.

Incidentally, though there is shown, in FIG. 1, an occasion wherein three sheet feed cassettes, bypass feed tray 41H and outer sheet feed means 41L which come to five in total are provided, the number of sheet feed means which can be provided is not limited in principle in the invention. Namely, it is possible to provide any number of sheet feed means.

Figure 17:
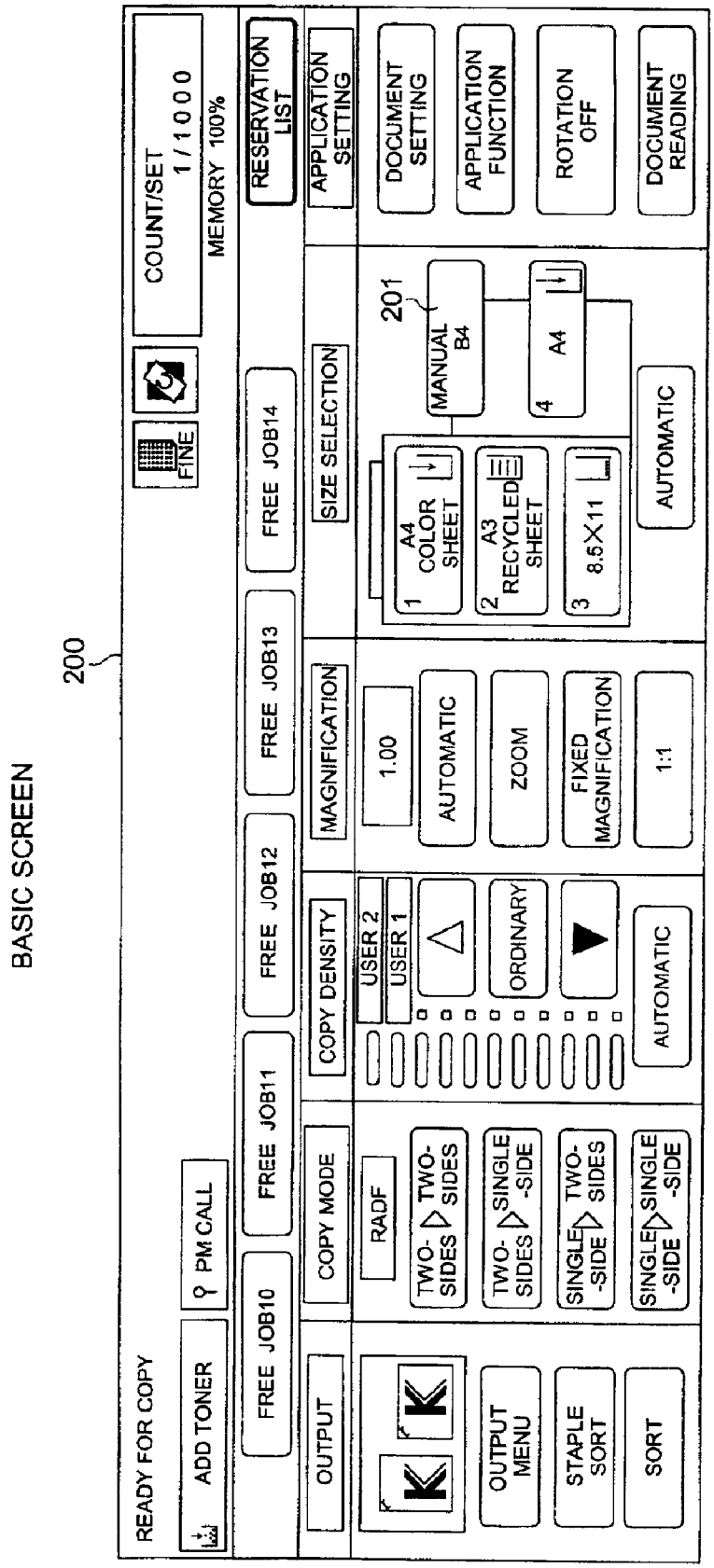
FIGS. 17 to 22 are views showing a operating screen on a display.
Figure 18:
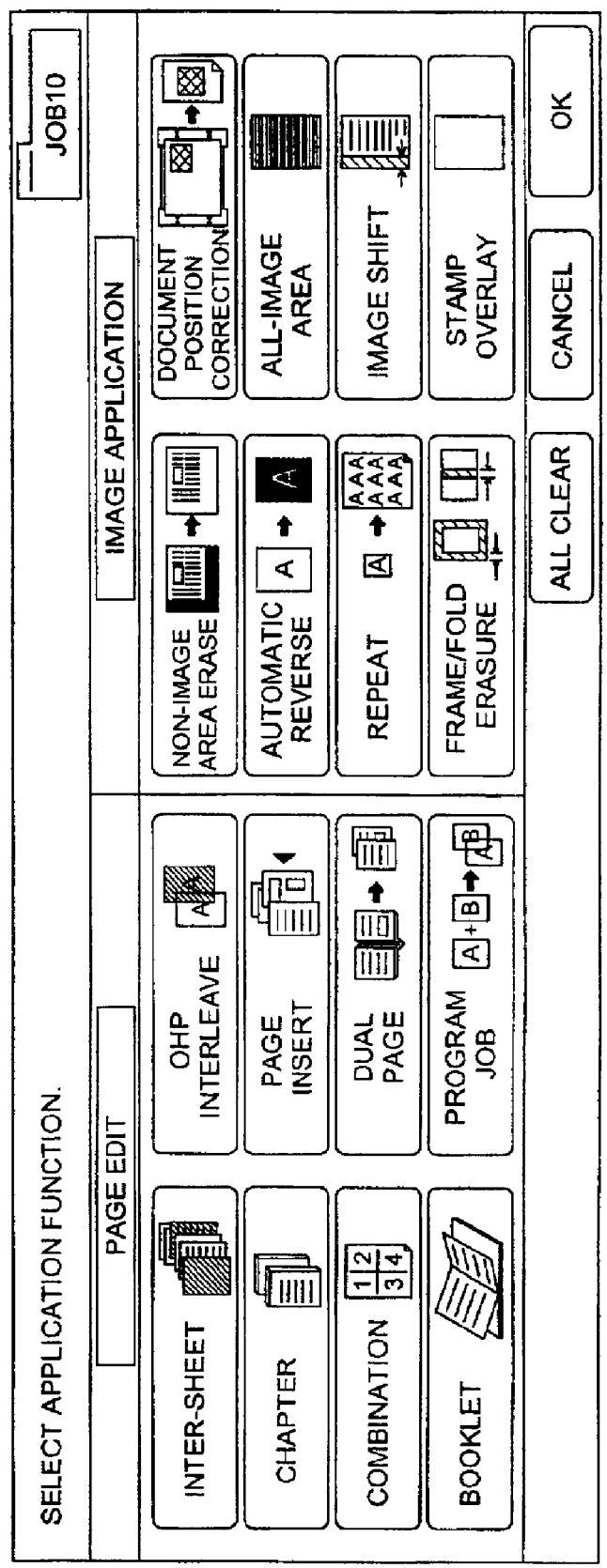
Figure 19:
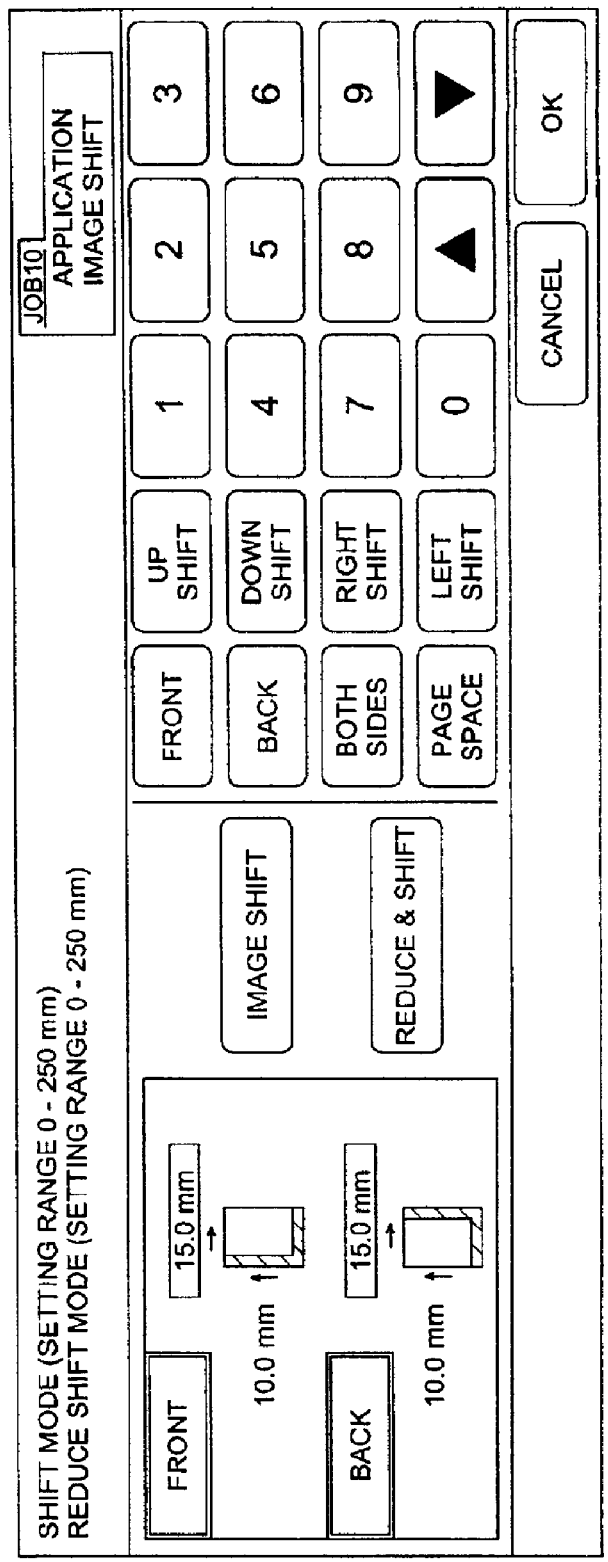
Figure 20:
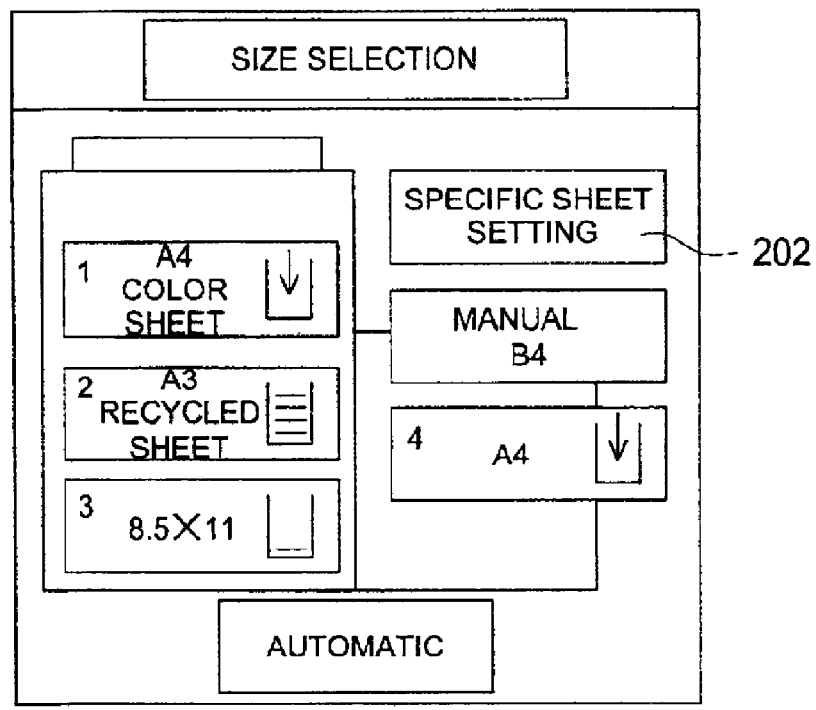
Figure 21:
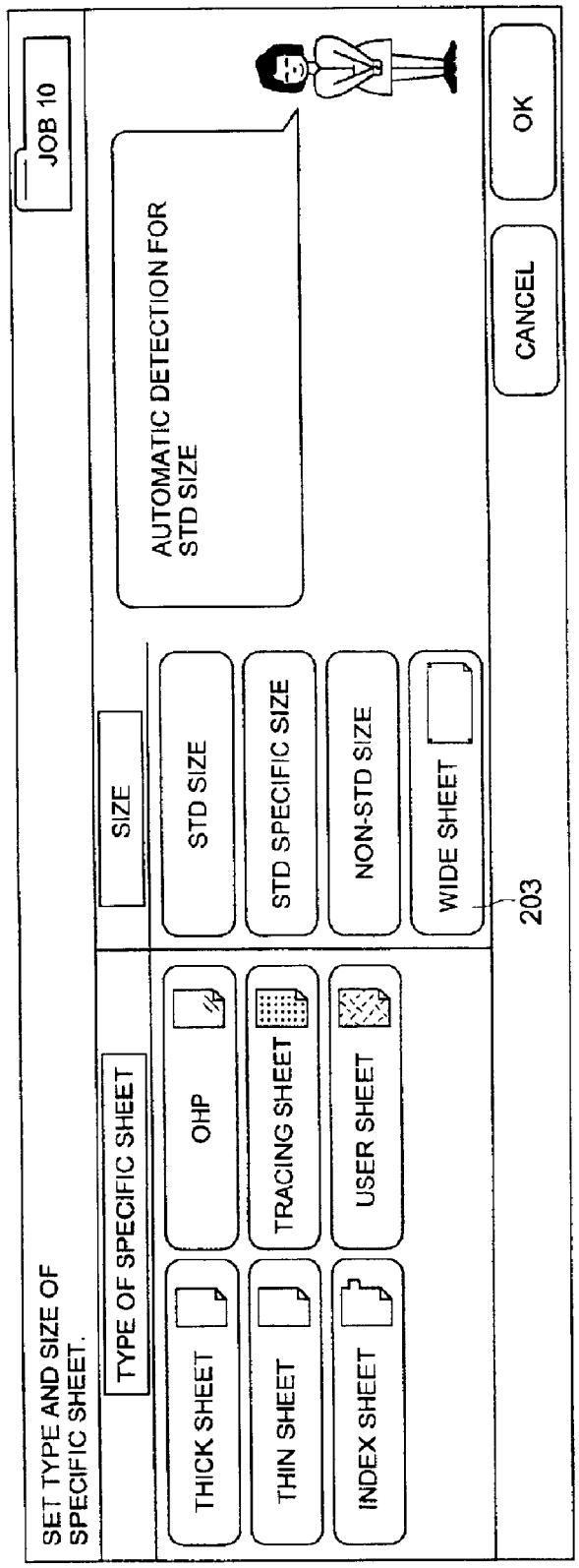
Figure 22:
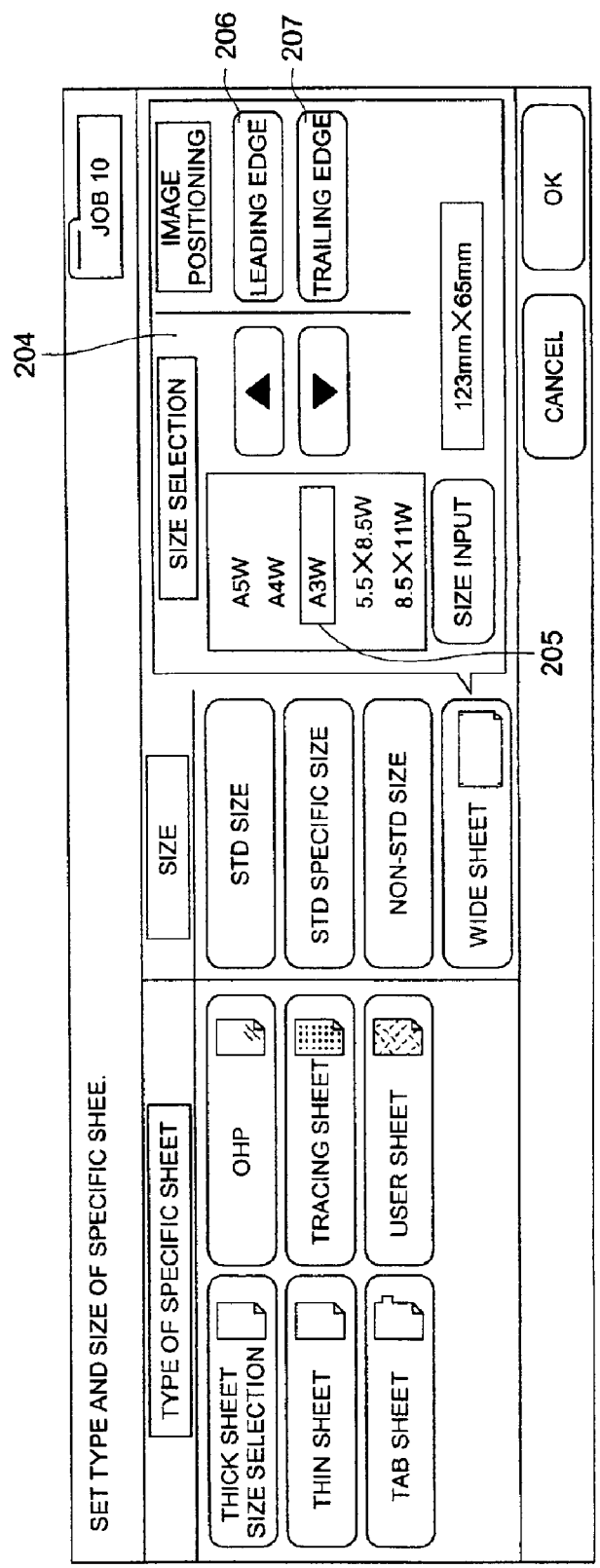

In a copying apparatus in the present embodiment, basic screen 200 of an operation section for setting various setting types is shown in FIG. 17. An arrangement is made so that a prescribed function may be set when each setting button of the basic screen 200 is pressed. When a user wishes to record an image on a wide sheet put on the bypass feed tray 41H, the user presses "bypass feed tray" button 201 in a "size selection" area of the basic screen 200. Then, "specific sheet setting" button 202 is indicated on a display in an area of the size selection, as shown in FIG. 20, and the user successively presses the "specific sheet setting" button 202. After this pressing, a specific sheet setting screen is displayed on the operation section as shown in FIG. 21. Thereby, the user presses "wide sheet" button 203 on this screen. Then, pop-up screen 204 is displayed on a "size" area as shown in FIG. 22. The pop-up screen 204 is composed of a "size selection" area indicating various sizes of prescribed wide sheets and of an "image positioning" area indicating various buttons for designating recording positions for images for wide sheets. In this case, when a wide sheet to be used is one based on a fixed-form A3 size, a user presses "A3W" button 205. Further, when the user wishes to position the recording position for an image at the leading edge of a wide sheet, the user presses "leading edge" button 206 in an "image positioning" area. When the user wishes to position the recording position for an image at the trailing edge of a wide sheet, the user presses "trailing edge" button 207. Due to the foregoing, recording control is carried out in the copying apparatus so that an image may be recorded on the designated position. Namely, when aligning an image recording position for a wide sheet to the leading edge or the trailing edge, a simple operation makes it possible to change the position.

Further, in the case of using the wide sheet by putting it in one of sheet feed cassette 41₁, 41₂, 41₃, it may be structured such that, for example, a key operator screen is indicated on the basic screen when password is inputted and an input to set the wide sheet can be executed from the key operator screen. Needless to say, the setting method is not limited to this example.

Figure 2:
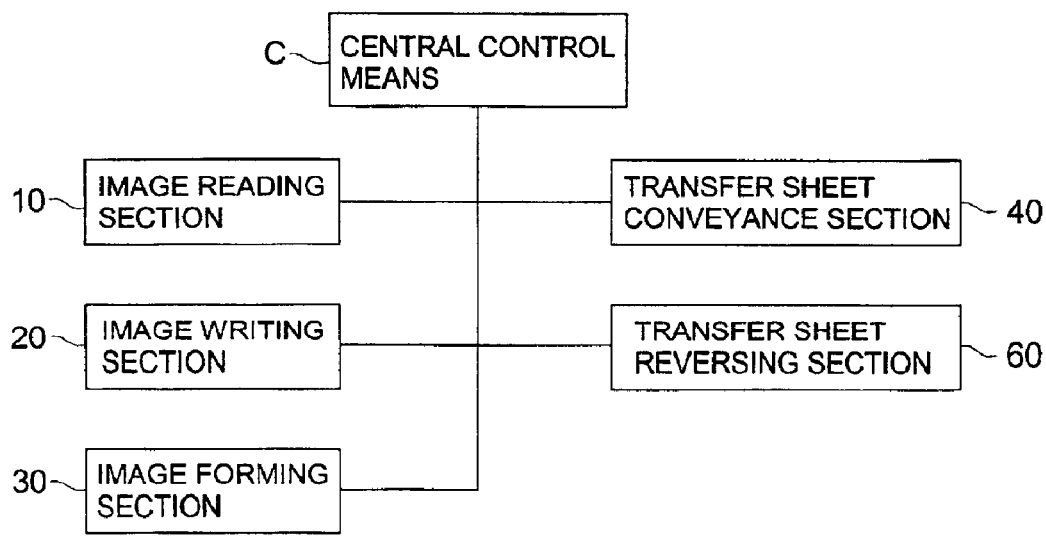
FIG. 2 is a schematic view showing an electric example of structure of a copying machine concerning the present embodiment.

Next, referring to FIG. 2, there will be explained an example of an electrical structure concerning the copying apparatus whose mechanical structure is stated above. Various mechanisms in the aforesaid image reading section 10, image writing section 20, image forming section 30, transfer sheet conveyance section 40 and transfer sheet reversing section 60 are arranged to be controlled by central control means (control means) C as shown in FIG. 2.

In this case, the central control means C in the present embodiment has the following operations and functions, in particular. First, as a basic function that is an assumption, it is possible to form an image on transfer sheet P whose area is greater than transfer sheet P having a certain prescribed fixed form size. In this case, "a certain prescribed fixed form size" (hereinafter referred to simply as "fixed form size") means both sizes conforming to the standard specifications in Japan such as, for example, A4, A3, B4 and B5 and sizes which are generally fixed forms in foreign countries such as 8.5×11 inch and 11×17 inch. Incidentally, the latter is sometimes called "fixed form special size" in particular.

A sheet which is generally called "a wide sheet" corresponds to "a transfer sheet whose area is greater" than a transfer sheet having the fixed form size. Conversely speaking, the "wide sheet" is a transfer sheet form stipulated as one having lengths extended respectively in the longitudinal and lateral directions from the standards (standard fixed form sizes) of a certain fixed form size.

If an image in A4 size is formed on the wide sheet of this type, for example, on the wide sheet whose standard fixed form size is A4 size, there is generated, on that wide sheet, a margin equivalent to the extended length. This margin is used as a portion to be cut in the binding process succeeding to the image forming.

Incidentally, a length to be "extended" basically depends on the standards stipulated by each paper mill independently. In other words, "A3 wide sheet" made by paper mill A and that made by paper mill B can sometimes be different in terms of a size (or an area) each other. When "a wide sheet" is mentioned, its sized (or an area) is not determined univocally, and it can be said that the size is optional.

Further, in description for the specification and drawings, symbol "P" is used to represent "a transfer sheet" and "a wide sheet".

Operations and effects of the copying apparatus having the aforesaid structure will be explained as follows. Incidentally, operations, effects or functions described below are generally related to adjustment of an image forming position on wide sheet P, and this adjustment is realized when central control means C controls the image writing section 20, especially an unillustrated semiconductor laser and changes a form of an electrostatic latent image formed on photoreceptor drum 31 properly. Namely, semiconductor laser control related to the aforesaid adjustment is conducted in addition to laser control by document surface image information obtained by the image reading section 10. Then, for the image forming thereafter, the surface of wide sheet P fed in by transfer sheet conveyance section 40 is made to come in contact with the surface of the photoreceptor drum 31 so that toner may be transferred onto the wide sheet P.

With regard to adjustment of an image forming position, it can naturally be made by a method to conduct shift processing for image data, for example, and thereby to conduct writing control based on the shift-processed image data, in addition to a method to control the radiation timing of a semiconductor laser.

(Function to Align Leading Edges or Centering Function)

In general, when forming an image on the wide sheet P, central control means C can form the image on the wide sheet P so that a center point defined with respect to the main scanning direction for the wide sheet P may be positioned on one center line defined with respect to the image to be formed, and one side of the image may be in parallel with one side of the wide sheet P.

Figure 3:
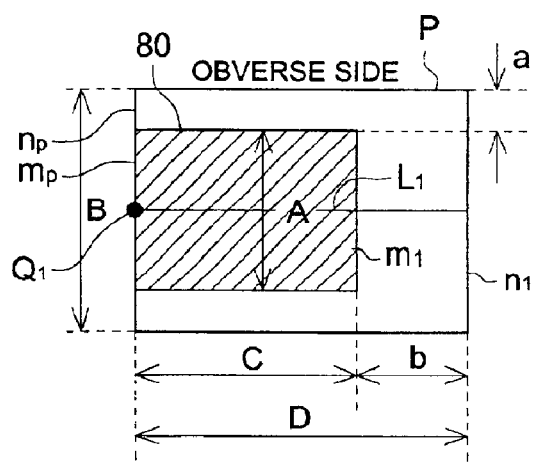
FIG. 3 is an illustration showing the state of image forming wherein aligning of leading edges is conducted for a wide sheet.

To be more concrete, as shown in FIG. 3, for example, there is conducted image forming wherein length A of image 80 in the main scanning direction is connected with length B of wide sheet P in the main scanning direction to satisfy the following expression.

$$a=(B-A)/2$$

Here, length A of an image in the main scanning direction is "document main scanning size×main scanning magnification" as shown in FIG. 3. The document main scanning size is a size of the document itself relating to main scanning, and main scanning magnification is enlargement magnification and reduction magnification which can be determined in advance concerning itself. To be concrete, for example, when document main scanning size is determined to 210 mm and reduction magnification is determined to 0.9, A=210×0.9=189 mm holds. Further, in the drawing, length C in image sub-scanning direction is in exactly the same relation as in the foregoing.

Then, "a" is a distance between one side of wide sheet P stipulated as sub-scanning direction and one side of image 80 facing the aforesaid side, and "a" is defined at two places as shown in FIG. 3 (this can be understood because the expression above can be changed to 2a=A=B). As is apparent from FIG. 3, positional relationship between image 80 and wide sheet P stipulated as stated above is nothing but a concrete form that "center point $Q_1$ defined with respect to main scanning direction of a transfer sheet" is "positioned on center line $L_1$ defined with respect to image 80" to be formed.

Further, it is easily understood in FIG. 3 that "one side of image 80 is in parallel with one side of a transfer sheet" means that one side m1 of image 80 is in "parallel" with one side $n_1$ of transfer sheet P. Incidentally, in the case of FIG. 3, one side $m_p$ (the other side) of the image agrees with one side $n_p$ (the other side) of transfer sheet P.

Figure 4:
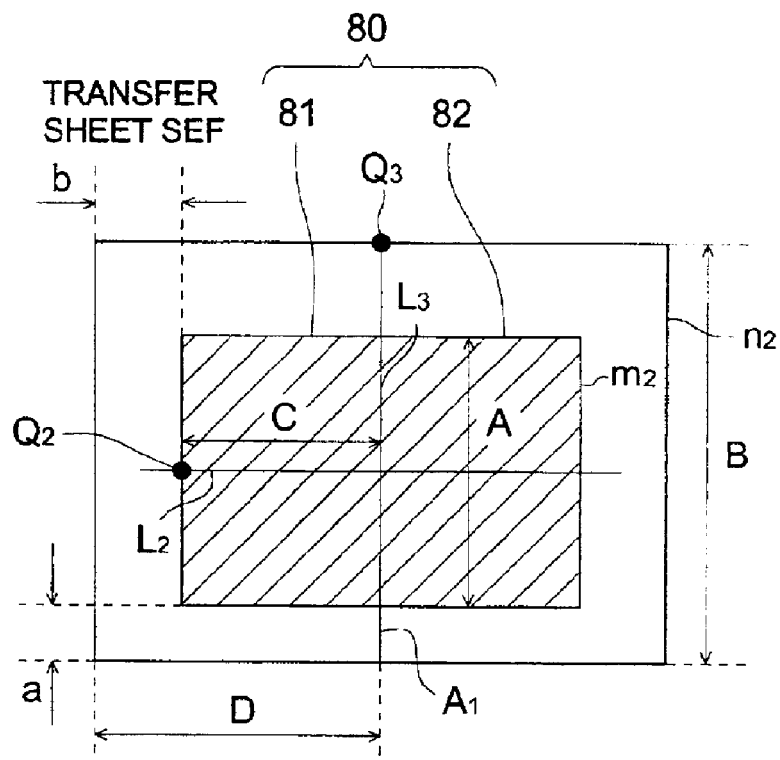
FIG. 4 is an illustration showing the state of image forming wherein centering is conducted for a wide sheet.

With respect to the image forming function like that stated above, it is possible to present one shown in FIG. 4, for example, as another example. FIG. 4 shows one related to the occasion wherein two images 81 and 82 are arranged, as illustrated, to be one image 80 which is to be formed on one transfer sheet P. The images 81 and 82 in this case can be considered to be those derived from images described respectively, for example, on two documents. Further, to be more concrete, arrangement to be one image 80 means that forming of an electrostatic latent image on photoreceptor drum 31 is conducted with that one image 80 serving as a unit.

First, even in such a case, it is possible to confirm that there is conducted image forming wherein "center point $Q_2$ defined with respect to the main scanning direction for a transfer sheet is positioned on one center line $L_2$ defined on image 80 (the center line $L_2$ is a center line defined in terms of the main scanning direction) to be formed" and "one side $m_2$ of the image is in parallel with one side $n_2$ of the transfer sheet".

In addition to the conditions stated above, it is characteristic in FIG. 4 that "center point $Q_3$ defined with respect to the "sub"-scanning direction for a transfer sheet is positioned on "center line $L_3$ perpendicular" to one center line stated above" (the center line $L_3$ is a center line defined in terms of the sub-scanning direction).

Putting all conditions stated above together, a center point of image 80 to be formed agrees in terms of position with that of wide sheet P, after all.

To be more concrete, there is conducted image forming wherein length C of image 81 or 82 in the sub-scanning direction and amount D equivalent to a half of a length of wide sheet P in the sub-scanning direction are made to relate to each other under the following condition, as shown in FIG. 4 together.

$$b=D-C$$

In this case, what "b" means is almost the same as "a" mentioned above, which is apparent.

Figure 5:
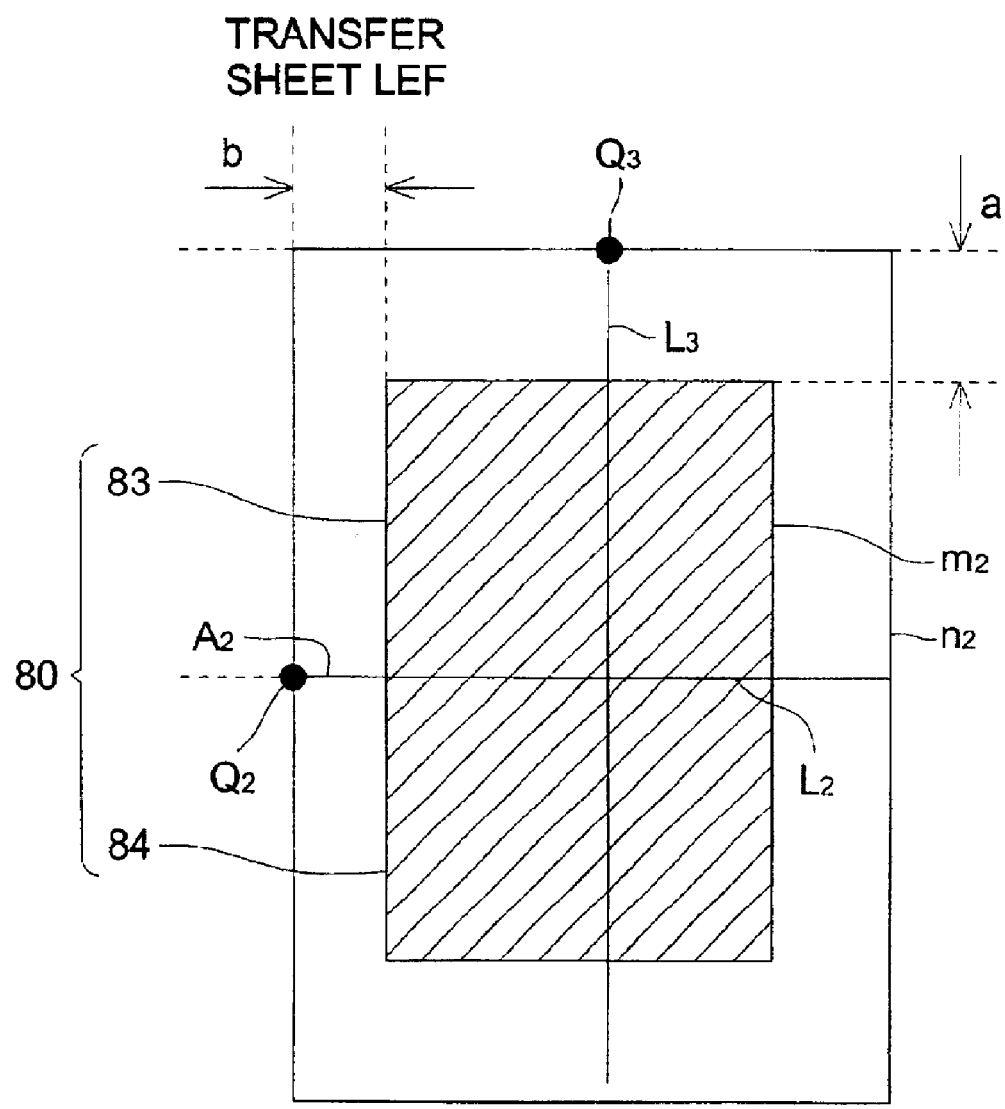
FIG. 5 is an illustration showing the state of image forming wherein centering is conducted, which is different from that in FIG. 4.
Figure 6:
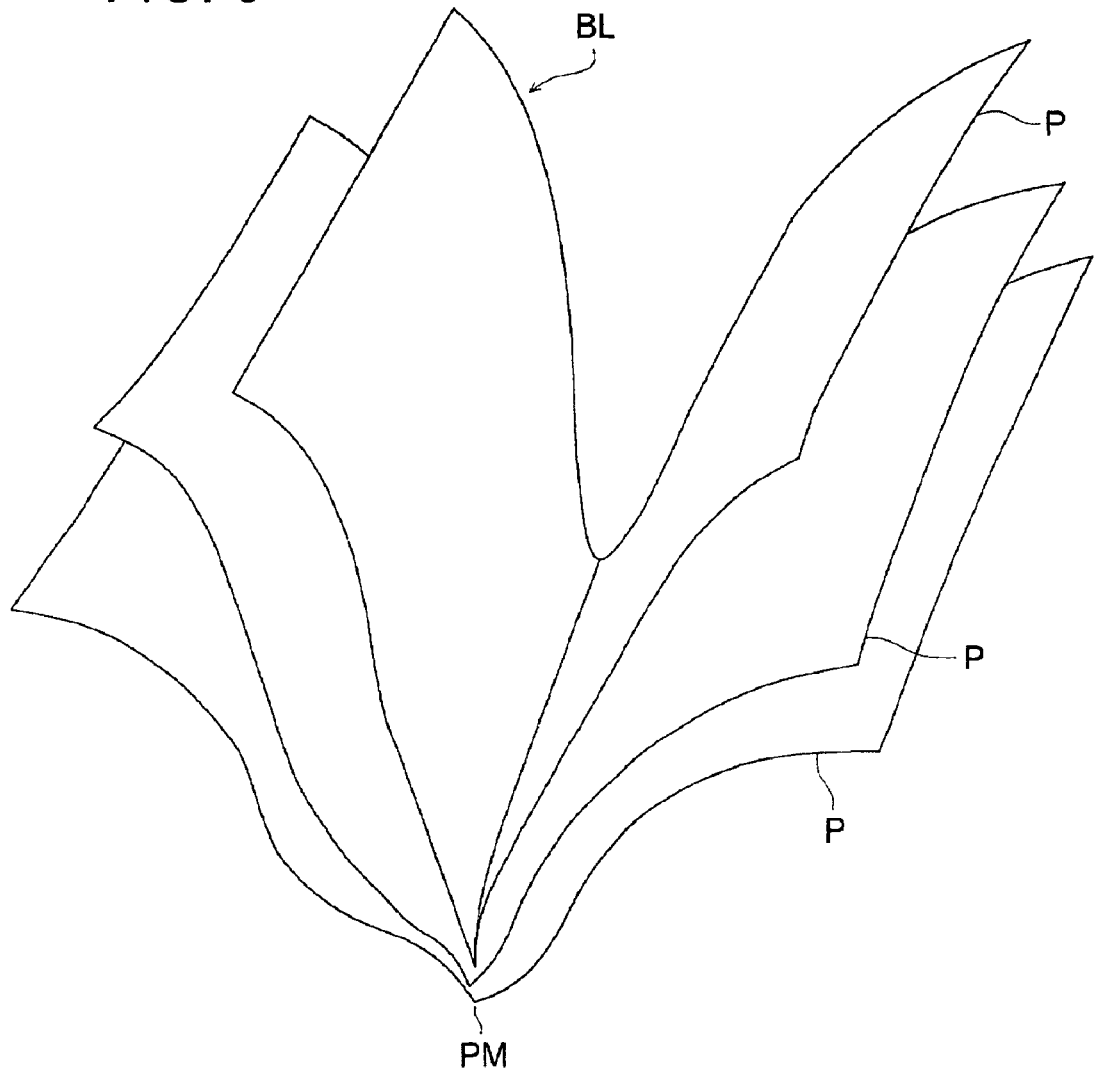
FIG. 6 is an illustration showing a form of a booklet.

With respect to FIG. 4, it is also possible to present a concrete form like one shown in FIG. 5, separately from FIG. 4. In this drawing, there is shown an occasion wherein a length in the main scanning direction is greater than that in the sub-scanning direction, which is different from FIG. 4. Incidentally, transfer sheet conveyance in the occasion shown in FIG. 4 is called "SEF" and that in the occasion shown in FIG. 5 is called "LEF", which has been explained earlier.

Even in the case shown in FIG. 5, it is understood that a center point of image 80 (composed of images 83 and 84) to be formed agrees in terms of position with that of wide sheet P, after all as stated above, is realized.

Incidentally, an image forming method for wide sheet P shown in FIG. 4 or FIG. 5 is one suitable to be applied to image forming relating to the so-called "booklet form" and image forming concerning "fixed form 2 repeat form".

In this case, the "booklet form" is a form wherein transfer sheet (=wide sheet) P that is folded double is interposed and its folded portion PM is bound to be a form of "booklet BL" finally, and image forming relating to that form means image forming for each of a plurality of transfer sheets P constituting the booklet BL. Further, the "fixed form 2 repeat form" means an occasion wherein the same image is formed repeatedly on both sides at left and right of one wide sheet P shown in FIG. 4 or FIG. 5. In other words, image 81 and image 82 are the same in terms of contents, or image 83 and image 84 are the same in terms of contents.

With respect to image forming relating to the "booklet form" or to the "fixed form 2 repeat form", when conducting an image forming method shown in FIG. 4, center point $Q_3$ of wide sheet P with respect to the sub-scanning direction is positioned on folded line $A_1$ in the sub-scanning direction shown in the same drawing, and when conducting an image forming method shown in FIG. 5, center point $Q_2$ of wide sheet P with respect to the main scanning direction is positioned on folded line $A_2$ in the main scanning direction shown in the same drawing. The reason for calling the "folded line" in this case is because the folded line $A_1$ or $A_2$ corresponds to its binding portion, namely to the folded portion PM, as is apparent from consideration of the "booklet form".

The reason why the image forming method shown in FIG. 4 or FIG. 5 is appropriate in image forming relating to the booklet form as this is because a cutting operation is easy in the binding process after the image 80 (images 81 and 82 or images 83 and 84) is formed.

(Adjustment of Positions for Two-sided Image Forming)

When the function to align leading edges or the centering function is carried out and when image forming is intended to be carried out even on the reverse side of wide sheet P, central control means C can make the image forming position on the obverse side to be the same as that on the reverse side.

Figure 7:
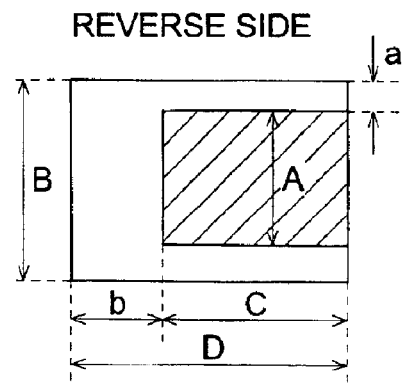
FIG. 7 is an illustration showing the state of conducting image forming on a reverse side of a wide sheet when conducting image forming shown in FIG. 3 on an obverse side of the wide sheet.

Namely, in this case, the position for aligning leading edges in FIG. 7 is made to be at the right side in the drawing while the position for aligning leading edges in FIG. 3 is at the left side in the drawing, as is understood when referring to FIG. 7 while comparing with FIG. 3. By doing this, there is attained positional agreement between image forming positions respectively for the obverse side and the reverse side of wide sheet P. Incidentally, the centering function is not illustrated, but in this case, positional agreement of image forming positions can be attained basically, if the reverse side is subjected to image forming which is the same as that for the obverse side.

Incidentally, in such a case, central control means C is to conduct the control with respect to the semiconductor laser stated above, taking the operation mode of the transfer sheet reversing section 60 into consideration.

(Page Distance Extending Function)

Next, the central control means C can demonstrate "page distance extending function" with respect to image forming as shown in FIG. 4 or FIG. 5. Namely, image 81 and image 82 or image 83 and image 84 which are to be formed respectively on both sides of the standard line represented by the main scanning direction $A_2$ or by folded line $A_1$ in the sub-scanning direction can be extended in terms of distance between them to be formed, as shown in FIG. 8 or FIG. 9.

In detailed description, since both images 81 and 82 or images 83 and 84 both positioned respectively at left and right portions or at upper and lower portions of main scanning direction $A_2$ or of folded line $A_1$ in the sub-scanning direction are positioned respectively on a different page in the form of booklet (see FIG. 4), as is apparent from consideration of the "booklet form", the "page, distance and extending" means that "distance" of image forming is "extended" between each "page".

To be concrete, as shown in FIG. 8 together, when a distance between pages is represented by v, shifting amount $v_1$ for the page on the left side is expressed by $v_1=-(v/2)$ and $v_2$ for the page on the right side is expressed by $v_2=v/2$.

Further, in FIG. 9, for a shifting amount for each of an upper page and a lower page, the same calculation is conducted.

Incidentally, though shifting of "negative amount" is conducted for a page on the left side and a page on the lower side, in FIG. 8 and FIG. 9, this is nothing but the stipulation that the direction toward the left side and the downward direction are negative. Therefore, there is no doubt that invention is not limited to this form.

Due to the foregoing, binding of the folded portion PM can be conducted without damaging images to be formed.

(Shift Function)

Figure 10:
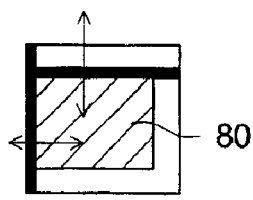
FIG. 10 is an illustration showing how a shifting function is conducted with respect to the image shown in FIG. 3.

Lastly, the central control means C can demonstrate "shift function" with respect to images shown in FIG. 3, FIG. 4 or FIG. 5, and FIG. 8 or FIG. 9. This "shift function" makes image 80 shown in FIG. 3 to be shifted up and down and from side to side as shown with an arrow in the drawing, on the basis of thick lines shown in FIG. 10.

Figure 11:
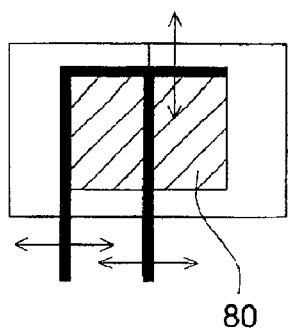
FIGS. 11($a$) and 11($b$) are illustrations showing how a shifting function is conducted with respect to the image shown in FIG. 4 or FIG. 5, wherein FIG. 11($a$) is related to FIG. 4 and FIG. 11($b$) is related to FIG. 5.
Figure 11:
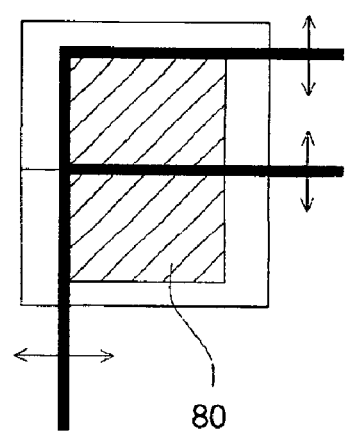
Figure 12:
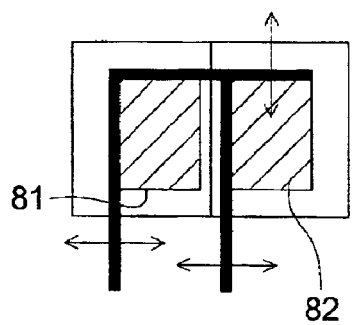
FIGS. 12($a$) and 12($b$) are illustrations showing how a shifting function is conducted with respect to the image shown in FIG. 8 or FIG. 9, wherein FIG. 12($a$) is related to FIG. 8 and FIG. 12($b$) is related to FIG. 9.
Figure 12:
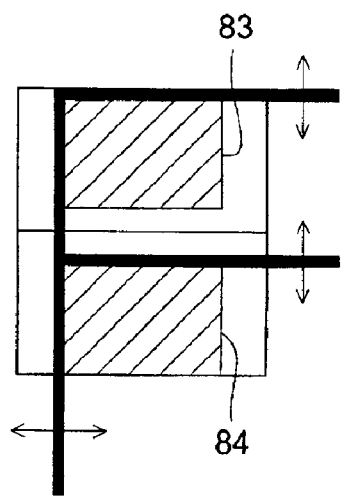

In the case of image 80 as shown in FIG. 4 or FIG. 5, it is possible to shift up and down and from side to side on the basis of thick lines shown in FIG. 11(a) or FIG. 11(b). Further, in the case of images 81 and 82 or images 83 and 84 as shown in FIG. 8 or FIG. 9, it is possible to shift the images 81 and 82 or the images 83 and 84 "whole" up and down and from side to side on the basis of thick lines shown in FIG. 12(a) or FIG. 12(b). Namely, with regard to the occasion to shift images after "page distance extending" in FIG. 8 or FIG. 9 is conducted, the shifting is conducted while extending distance v is maintained.

Incidentally, even in any shifting described above, when forming images even on the reverse side of wide sheet P (see the aforesaid "Adjustment of positions for two-sided image forming"), it is preferable to arrange a form wherein shifting of an image relating to the reverse side is automatically conducted so that the shifting may correspond to shifting for the obverse side. Namely, in explanation referring to FIG. 10 and FIG. 7, if shifting in prescribed amount is conducted to the right side in FIG. 10, shifting in the same amount is conducted automatically in FIG. 7 to the left side in the drawing.

Figure 13:
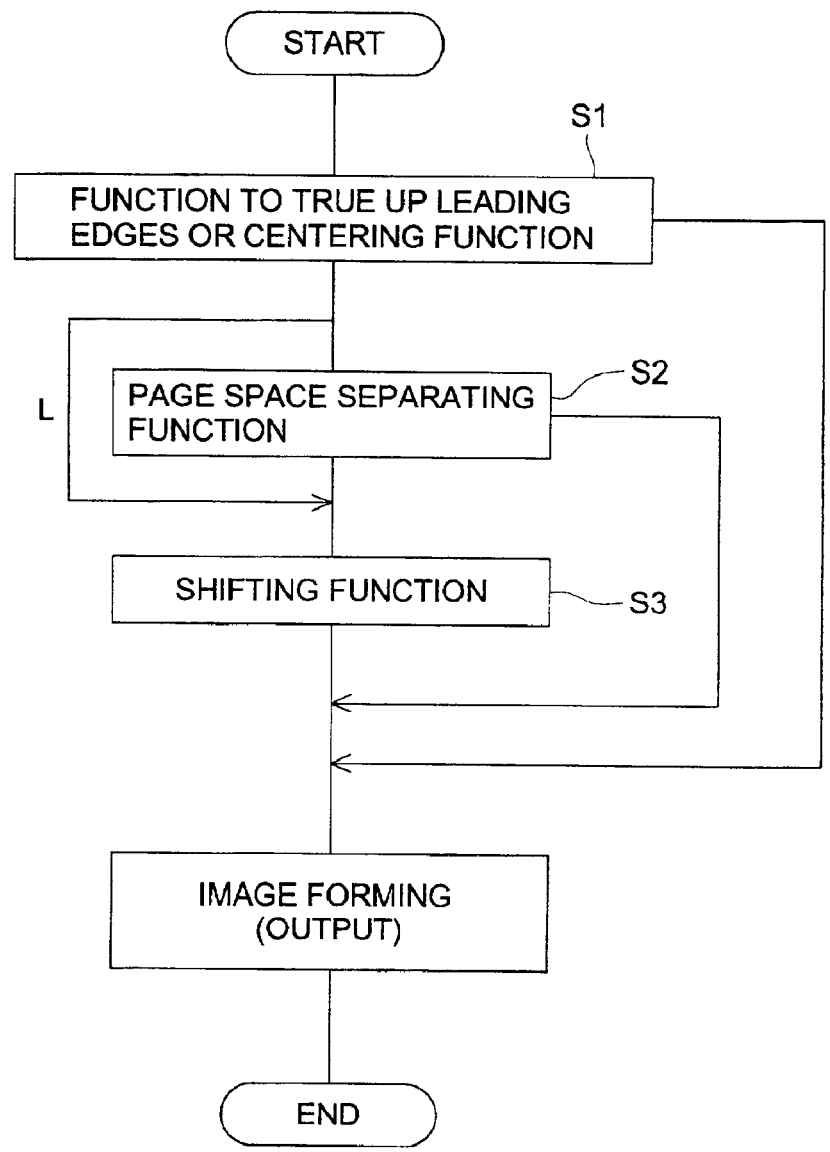
FIG. 13 is a flow chart showing collectively flows of image forming functions related to the present embodiment.
Figure 14:
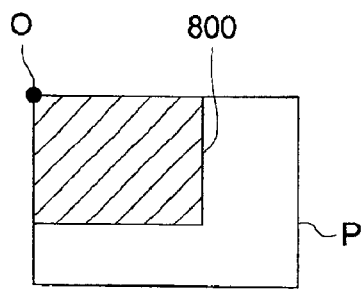
FIG. 14 is an illustration showing how image forming is conducted for a conventional wide sheet.
Figure 15:
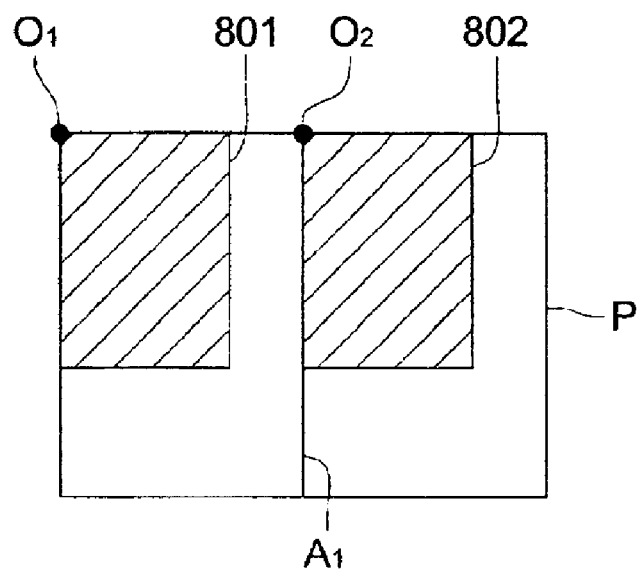
FIG. 15 is an illustration showing the state of image forming for a conventional wide sheet, which is different in terms of a mode from that in FIG. 14.
Figure 16:
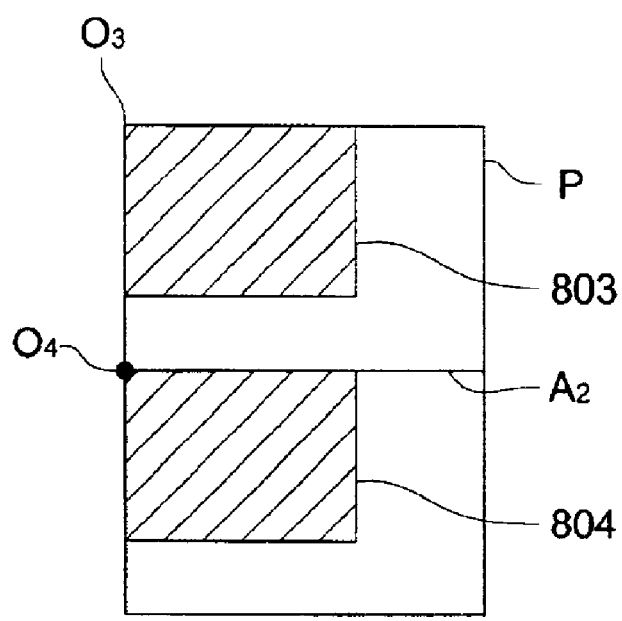
FIG. 16 is an illustration showing the state of image forming for a conventional wide sheet, which is different in terms of a mode from that in FIG. 14.

If the image forming functions explained above are summarized as an example of work procedures (flow chart), they turn into those shown in FIG. 13. Namely, in step S1, a step of aligning leading edges or a step of centering for image 80 is conducted (FIG. 3 or FIG. 4 or FIG. 5). When image 80 is composed of two images in particular, a step of page distance extending is conducted in step S2 (see FIG. 8 or FIG. 9). Then, in step S3, shifting function is conducted. Concrete operations in each step S1, S2 and S3 are those explained above.

Incidentally, as is apparent in FIG. 13, after aligning of leading edges or centering (step S1) is conducted, it is either possible to conduct image forming immediately, or to conduct image forming after conducting two steps of the aforesaid step and a page distance extending step (steps S1 and S2). Further in particular, it is possible to conduct shifting function after conducting aligning of leading edges (omitting step S2) and to conduct image forming (see lines marked with symbol L). It is naturally possible to conduct image forming after conducting all steps (steps S1, S2 and S3). After all, selection of steps shown in FIG. 13 to be used for actual image forming is up to a user of the apparatus, depending on the image form.

In the case of forming images on both sides of transfer sheet P, when each of steps S1, S2 and S3 is conducted, it is preferable to arrange a form wherein an adjustment of positions for two-sided image forming is constantly considered. For example, it is preferable to arrange a form wherein when prescribed extending distance v is taken in a page extending step, the same page extending is carried out for both sides of transfer sheet P, and even when shift function is conducted, shifts which are opposite to each other are applied respectively on the obverse side and the reverse side so that image forming positions for the obverse side and the reverse side of transfer sheet P may be the same in terms of position, as stated earlier.

As explained above, the image forming apparatus and the image forming method of the invention make it possible to improve total workability relating to setting when forming images on a wide sheet. This makes it possible to enjoy remarkably the effect of the invention especially when the invention is applied to the image forming relating to the booklet form or to the image forming relating to the fixed form 2 repeat system.

What is claimed is:

1. An image forming apparatus for forming an image on a recording sheet, comprising:

an image forming member which forms an image on a wide sheet;

a sheet feeder which feeds the wide sheet to the image forming member;

an input section which sets a reference recording sheet having a predetermined sheet size for the wide sheet whose size is larger than the predetermined sheet size of the reference recording sheet; and a controller which controls the image forming member so as to form an image on the wide sheet such that a first central point of the wide sheet defined in terms of a main scanning direction perpendicular to a feeding direction of the wide sheet by the sheet feeder is placed on a first center line of the image, wherein the first center line is perpendicular to the main scanning direction, and one side of: the image is parallel to one side of the wide sheet.

2. The image forming apparatus of claim 1, wherein the controller is adapted to control the image forming member such that another side of the image coincides with another side of the wide sheet.

3. The image forming apparatus of claim 1, wherein the controller is adapted to control the image forming member such that a second central point of the wide sheet defined in terms of the feeding direction of the wide sheet is placed on a second center line of the image perpendicular to the first center line.

4. The image forming apparatus of claim 1, wherein the controller is adapted to control the image forming member such that a position of a page image to be formed on an obverse side of the wide sheet coincides with that of another page image to be formed on a reverse side of the wide sheet.

5. The image forming apparatus of claim 1, wherein the controller is adapted to control the image forming member so as to form the image on the wide sheet such that a central point of the wide sheet coincides with a central point of the image.

6. The image forming apparatus of claim 1, wherein the controller is adapted to control the image forming member with a first adjustment so as to form an image on the wide sheet such that a central point of the wide sheet coincides with a central point of the image and with a second adjustment so as to set a reference line along a feeding direction of the wide sheet by the sheet feeder or a main scanning direction perpendicular to the feeding direction and to shift the image from the reference line.

7. The image forming apparatus of claim 6, wherein the controller is adapted to further control the image forming member with a third adjustment to shift the image on the wide sheet.

8. The image forming apparatus of claim 1, wherein the controller is adapted to control the image forming member such that two page images are formed as a one page image.

9. The image forming apparatus of claim 8, wherein the controller is adapted to control the image forming member such that the two page images formed in the one page image are separated so as to provide space between the two page images.

10. An image forming method of forming an image on a wide sheet, comprising the steps of:

setting a reference wide sheet having a predetermined sheet size for the wide sheet whose size is larger than the predetermined sheet size of the reference recording sheet;

forming an image on the wide sheet such that a first central point of the wide sheet defined in terms of a main scanning direction is placed on a first center point line of the image, wherein the first center point line is perpendicular to the main scanning direction, and one side of the image is parallel to one side of the wide sheet.

11. The image forming method of claim 10, wherein the image is formed on the wide sheet such that another side of the image coincides with another side of the wide sheet.

12. The image forming method of claim 10, wherein a central point of the wide sheet coincides with a central point of a two page image in a first process, the two page image being separated into two separated page images based on a reference line defined along a main scanning direction or a sub-scanning direction in a second process and the two separated page images being shifted on the wide sheet in a third process.

* * * * *